HIGH SPEED COUNT RECORDER

Filed Sept. 22, 1955 2 Sheets-Sheet 1

INVENTOR.
RALPH GERBRANDS
BY Kenway, Jenney, Witter + Hildreth
ATTORNEYS

March 1, 1960 R. GERBRANDS 2,926,984

HIGH SPEED COUNT RECORDER

Filed Sept. 22, 1955 2 Sheets-Sheet 2

INVENTOR.
RALPH GERBRANDS

BY Kenway, Jenney, Witter + Hildreth

ATTORNEYS 2,926,984
Patented Mar. 1, 1960

2,926,984

HIGH SPEED COUNT RECORDER

Ralph Gerbrands, Arlington, Mass.

Application September 22, 1955, Serial No. 535,906

3 Claims. (Cl. 346—139)

The subject invention relates to recorders and in particular to a pen recorder capable of indicating accurately by means of a visual trace both the number and rate of events being recorded.

Various forms of recording mechanisms are known in the art. Many of these devices utilize a pen or other transcribing member in order to make a graphical record on a recording medium or web, preferably of paper.

It is common in such devices that the recording medium be moved at a constant rate, with the line drawn by the stylus on the recording medium providing a continuous record of the magnitude of the event being recorded. In certain instances, in order to reduce the quantity of paper or other recording medium required, the apparatus may be arranged to vary the rate of advance of the paper, while the stylus traverse across the paper takes place at a constant rate, followed by rapid return of the stylus carriage after it has reached a predetermined limit. In general, these devices are relatively slow in their movement, and most of them function on an analogue basis; that is the variable being recorded changes as a continuous function.

It is the object of this invention to provide a somewhat different form of recorder, adapted for indicating discontinuous phenomena, wherein the record is in the form of a step function rather than a smooth curve. It is a further object of this invention to provide a very high speed count recorder in which both the total number of counts and the varying rates at which the counts are received may be readily determined from the information provided by the record.

Figure 1:
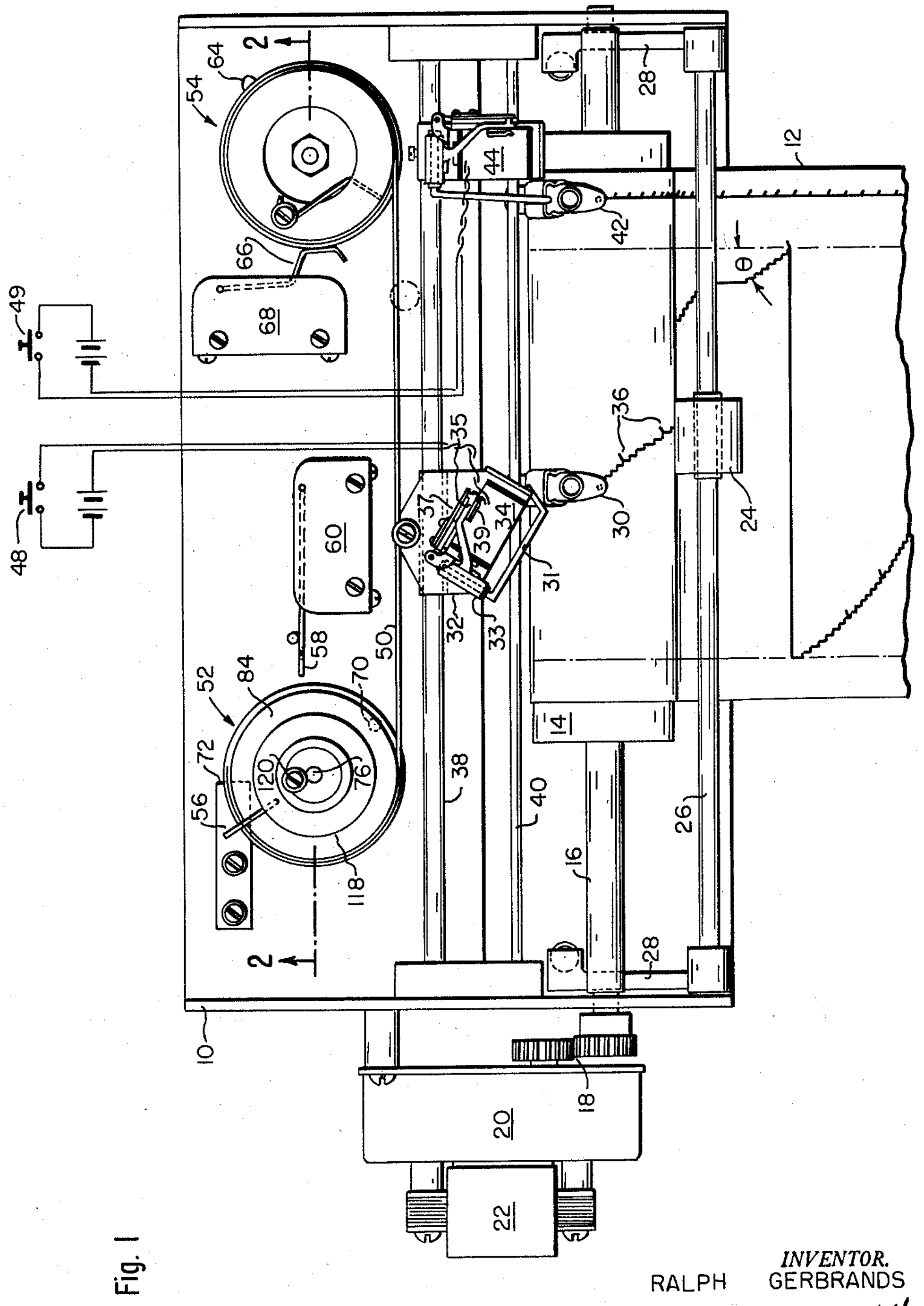
Figures 2, 3:
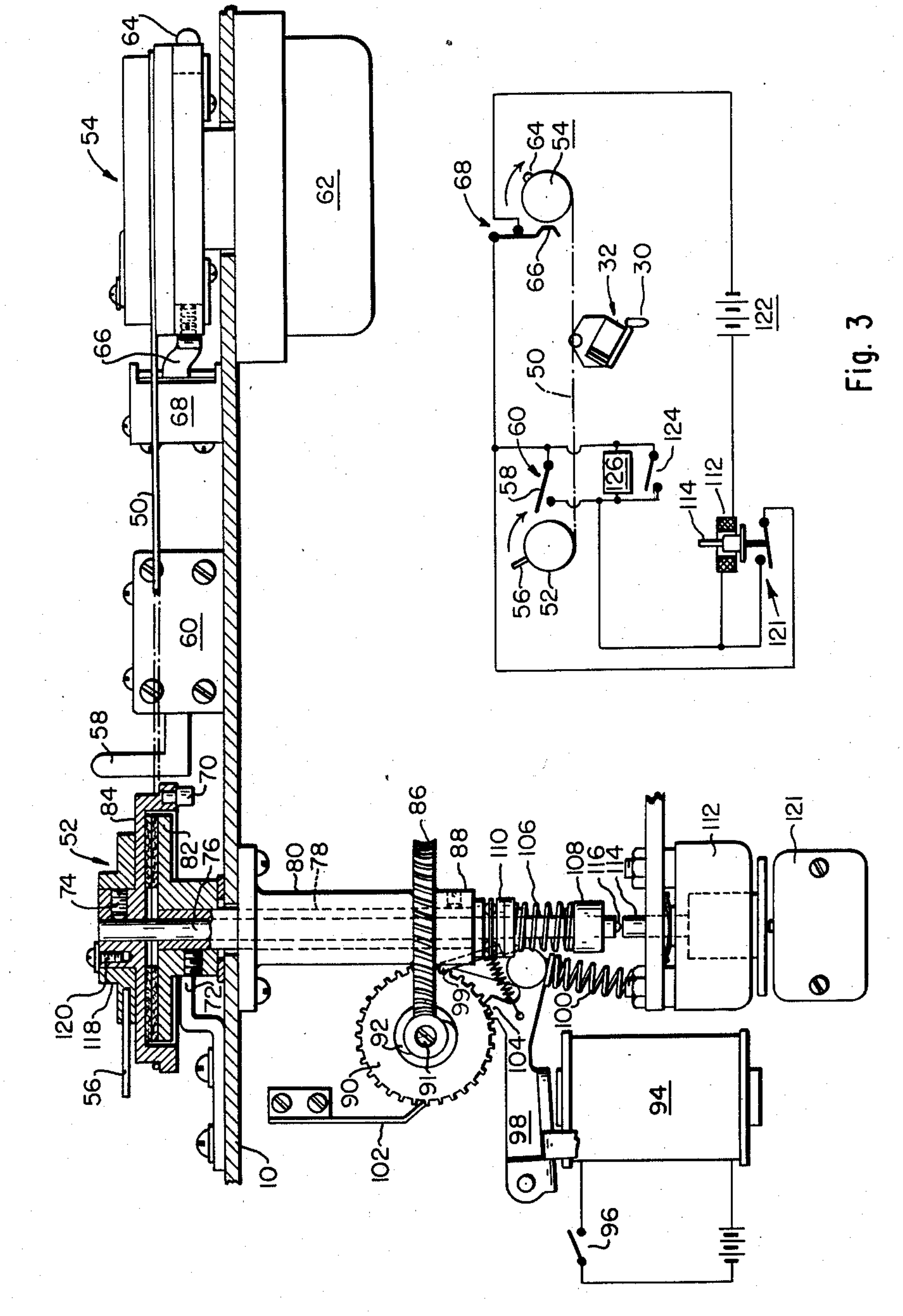

It is a feature of this invention that it utilizes a web of recording medium which is advanced over a drum at a substantially constant rate, together with a stylus which may be very rapidly traversed across the web parallel to the axis of the drum a discrete predetermined distance in response to each pulse or signal being recorded. It is a further feature of this invention that the apparatus may be used to provide several types of information simultaneously on the same record. It is a still further feature of this invention that it will record a very high input rate of counts which may exceed 500 counts per minute while maintaining a clear and acurate record. Other features will appear from the description of the invention with accompanying drawings in which:

Fig. 1 is a plan view of the recording apparatus showing the stylus carriage with portions of the traversing mechanism for carrying it across the web and for returning it, Fig. 2 is a view in elevation, partly in section and taken on the line 2—2 of Fig. 1, showing details of the return and drive mechanisms for the stylus carriage, and Fig. 3 is a diagrammatic showing of the electrical control system for stylus traverse and return.

In the apparatus shown in the drawings the case 10 contains a roll of paper recording medium or web 12, which is fed from a storage roll (not shown) over a drive roll 14. The drive roll is carried on the shaft 16 which is driven through gears 18 from the speed reducer 20. The speed of advance of the web may be easily changed by changing the ratio of the coupling gears 18. The driving power is supplied by the constant speed motor 22 which may be a synchronous electric motor. The gears 18 may be readily changed to alter the velocity of the recording medium. The idler roll 24 which assists in maintaining the web in non-slipping relation to the drive roll is carried on the shaft 26 which is urged toward the drive roll 14 by the spring-loaded supporting arms 28. The idler roll 24 is free to rotate about the shaft 26 on suitable bearings but is longitudinally adjustable along said shaft as may be desired.

The movable stylus 30 is carried on a traversing carriage 32. The carriage 32 is supported and guided across the web by the rod 38 extending parallel to the axis of the drive roll through a bore in the body of the carriage so that the carriage is free to rotate about the rod 38. The forepart of the carriage adjacent the roll rests on the upper surface of the rod 40 which acts as a supporting and positioning rail as the carriage traverses parallel to the roll. The carriage may be swung upward away from the rod 40 about the rod 38 to facilitate inspection and repair or replacement of the stylus.

The stylus is movably mounted on an arm 31 carried in a bore in the cylindrical block 33 mounted on the carriage. This journal mounting permits the stylus free vertical movement. The tip of the stylus therefore supports only a portion of the weight of the stylus and the arm 31 and not the weight of the carriage which is borne entirely by the rods 38 and 40. The block 33 is pivotally mounted to the carriage 32 and carries an arm 35 which slides against the leaf spring 37 mounted on the carriage 32. The electromagnet 34 mounted on the carriage may be energized by closing switch 48 to attract the block 33 and move the stylus independently of the action of the carriage in order to make a mark signifying the occurrence of some specific independent phenomena. The spring will reposition the stylus by urging the bracket against a stop 39 on the carriage. The marks created by such independent actuation of the stylus are shown at the points 36.

A non-traversing stylus 42 may be provided for recording information along a margin of the web. This stylus is shown in association with actuating electromagnet 44 positioned on rods 38 and 40. Like solenoid 34 on the carriage, the stylus may be given a slight deviation to leave a special indication, when the solenoid is energized by closing the switch 49.

The carriage 32 is moved along its supporting guide rods by means of the cable 50 clamped to the back of the carriage. The cable is secured to two drums 52 and 54. The advance drum 52 carries the arm 56, and when the drum has rotated to the point where this arm comes in contact with the arm 58 of the limit switch 60 the driving mechanism which will be described in detail by reference to Fig. 2, is declutched and the cable rewound on the drum 54 which is turned by the governor-controlled spring motor 62.

As will be explained in greater detail by reference to Fig. 3, the temporary closing of the limit switch 60 activates a holding circuit. This is broken by contact of the pin 64 on the drum 54 with the arm 66 of the second limit switch 68. The action of the limit switch 68 re-engages the drive mechanism for the drum 52. The position of the stylus on being reset is fixed by the pin 70 against the stop 72 which positions the driving drum 52.

The drive and clutch mechanism is shown most clearly by reference to Fig. 2. The drum 52 is fixed by the set screw 74 to the clutch control shaft 76 which extends vertically through the hollow drive shaft 78. The shaft 76 acts as a supporting axle for the drum 52 and also moves the drum outward to disengage the clutch plate from the inner surface of the drum. The drive shaft 78 is housed in the journal bearing support 80 which is fastened to the case. The outer end of the drive shaft carries the flanged clutch plate 82 which makes contact with the inner surface of the drum hub 84. The inner end of the drive shaft carries the worm gear 86 having the hub 88 which is fastened by a set screw to the drive shaft. The gear 86 is driven by the rotation of ratchet 90 fixed to the shaft 91 carrying the worm 92. The ratchet 90 is rotated by action of the electromagnetic actuator 94 which, upon the closing of the switch 96, pulls the arm 98 compressing the spring 100. Upon return of the arm the pawl 99 advances the ratchet wheel one tooth in a counterclockwise direction. The catch 102 acts as a catch to prevent regression, and the catch 104 on the arm 98 prevents overtravel.

Contact between the clutch driving surface and the drum is maintained by the action of the spring 106 tending to expand against the flange 108 which forms the end of the shaft 76. The other end of the spring is held by the lower race of the ball thrust bearing 110 abutting the end of the drive shaft 78. Upon closing of the limit switch 60, the clutch actuating solenoid 112 forces the plunger 114 upward, and this action forces the shaft upward thereby compressing the spring 106. As soon as the surfaces of the drum 52 and the drive plate 82 are disengaged, the spring motor will return the stylus carriage. The only element other than the drum which will turn during the resetting of the carriage is the shaft 76, and friction of this shaft against the plunger 114 is minimized by the spherical surface 116 on the end of the shaft 76.

The drum 52 comprises an outer ring 118 which may be rotated about the periphery of the hub 84 and fixed in any desired position by means of the screw 120. The ring 118 carries the arm 56. The hub carries the stop 70 and is graduated on its upper surface to designate the number of pulses which will be obtained at each position of the arm 56 with respect to the stop 70. The drum thus acts as a counter, and the arm 56 may be set to throw the limit switch 60 after the drum has been actuated by a desired, predetermined number of pulses.

The clutch control circuit is shown by reference to Fig. 3. After rotation of the drum a predetermined amount the arm 56 will contact the arm 58 and close the switch 60 thereby energizing the solenoid 112 to elevate the plunger 114 and release the clutch. Raising the plunger 114 also closes the holding switch 121. Upon release of the clutch the spring motor 62 is free to rewind the cable 50 on the drum 54. When arm 56 is withdrawn from arm 58 switch 60 will open but holding switch 121 will continue to close the circuit permitting the battery 122 to actuate the solenoid 112 until the limit switch 68 is opened by action of the pin 64 after the rewinding has been completed. Switch 68 is normally closed, and opening it deenergizes solenoid 112 releasing the plunger 114 and opening the holding switch 121. The clutch is thereby engaged and the drum 52 will be again rotated by energization of the electromagnetic actuator 94.

While the usual method of using this device will be to record a specified number of counts which may be determined by setting the arm 56 with respect to the drum hub 84, it may in some cases be desirable to reset the stylus carriage independently. This may be readily accomplished by means of the switch 124 which is in parallel with the limit switch 60. This switch 124 may be conveniently operated by a timer 126 if desired. This timer can, of course, be driven by the synchronous roller drive mechanism.

This apparatus may be utilized in a variety of ways to provide a record of the number of times that the actuator 94 is energized and of the change of the rate of actuation. Obviously, while the manual switch 96 is used for illustrative purposes, current pulses of sufficient magnitude may be fed automatically to the recorder. In the ordinary operation of the device, the rate of occurrence of the actuating pulses will be determined by the angle $\theta$ (Fig. 1) which the stepped trace makes with the edge of the recording web. However, if a timer is used to reset the stylus, the varying distances which the stylus progresses along the web before being reset will indicate the different rates of occurrence during each cycle. In either event it is possible to redetermine with precision from the trace just when each event occurred during the recording, since the trace is in the form of a step function. Both the total number of discrete counts and the varying rates of occurrence are readily determined by inspection of the web. Independent phenomena can be recorded by actuation of the switch 48 which makes a sidewise line at an angle to the trace or by actuation of the stylus 42 which provides additional flexibility in the form of the record.

It will be understood that the above described apparatus is simply one form in which this invention may be constructed and that variations from the above construction may be made without departing from the invention which is defined by the following claims.

I claim:

1. In a cumulative count recorder of the type having a web-traversing stylus, means to advance and reset the stylus comprising a cable advance drum and a cable rewind drum having yieldable means for resiliently resisting rotation of the rewind drum in one direction, a rotatable drive shaft having a coaxial throughbore, stepping drive means connected to said drive shaft for discretely rotating the drive shaft, a control shaft extending through said throughbore for rotation and axial movement relative to the drive shaft, said advance drum including a first plate-like friction clutch element mounted for movement with one end of the drive shaft, one end of the control shaft extending beyond said one end of the drive shaft, a second plate-like friction clutch element mounted for movement with said one end of the control shaft and engageable with said first clutch element, a cable connected to the rewind drum and to said second clutch element and to the stylus, the other end of said control shaft extending beyond said other end of the drive shaft, spring means biasing said control shaft to urge said other end of the control shaft away from said other end of said drive shaft and engage said clutch elements and including a spring and a low friction bearing on one of the shafts mounting one end of the spring to minimize resistance to rotation of the control shaft relative to the drive shaft, a solenoid having a plunger disposed in end-to-end relation with said other end of the control shaft, said solenoid being operative to move said other end of the control shaft toward said other end of the drive shaft to separate said friction clutch elements, and a low friction bearing between the control shaft and plunger drivingly connecting the control shaft and plunger for axial movement to separate the clutch elements while permitting relative rotation between the plunger and control shaft.

2. In a cumulative count recorder of the type having a web-traversing stylus, means to advance and reset the stylus comprising a cable advance drum and a cable rewind drum having yieldable means for resiliently resisting rotation of the rewind drum in one direction, a rotatable drive shaft having a coaxial throughbore, stepping drive means connected to said drive shaft for discretely rotating the drive shaft, a control shaft extending through said throughbore for rotation and axial movement relative to the drive shaft, said advance drum including a first plate-like friction clutch element mounted for movement with one end of the drive shaft, one end of the control shaft extending beyond said one end of the drive shaft, a second plate-like friction clutch element mounted for movement with said one end of the control shaft and engageable with said first clutch element, a cable connected to the rewind drum and to said second clutch element and to the stylus, the other end of said control shaft extending beyond said other end of the drive shaft, a coil spring surrounding said other end of the control shaft and urging said other end of the control shaft away from said other end of the drive shaft, a low friction bearing having a pair of races one of which provides endwise support for one end of the spring, the other of the races being fixed relative to one of the shafts, means on the other of said shafts providing endwise support for the other end of the spring, a solenoid having a plunger disposed in end-to-end relation with said other end of the control shaft, said solenoid being operative upon energizing thereof to move said one end of the control shaft toward said one end of the drive shaft to separate said friction clutch elements, a low friction bearing engaged between the control shaft and plunger drivingly connecting the control shaft and plunger for axial movement while permitting low friction relative rotation between the control shaft and plunger, and switch means responsive to rotation of the advance drum a predetermined amount for energizing said solenoid to separate said clutch elements.

3. In a cumulative count recorder of the type having a web-traversing stylus, means to advance and reset the stylus comprising a cable advance drum and a cable rewind drum having yieldable means for resiliently resisting rotation of the rewind drum in one direction, a rotatable drive shaft having a coaxial throughbore, stepping drive means connected to said drive shaft for discretely rotating the drive shaft, a control shaft extending through said throughbore for rotation and axial movement relative to the drive shaft, said advance drum including a first plate-like friction clutch element mounted for movement therewith at one end of the drive shaft, one end of the control shaft extending beyond said one end of the drive shaft, a second plate-like friction clutch element mounted for movement with said one end of the control shaft and engageable with said first clutch element, a cable connected to the rewind drum and to said second clutch element and to the stylus, the other end of said control shaft extending beyond said other end of the drive shaft, a radially extending flange on said other end of the control shaft, a low friction bearing having a pair of races arranged over the control shaft with one race abutting said other end of the drive shaft, a compression coil spring arranged over the control shaft and engaged between the other of the races of said bearing and said flange and urging said clutch elements into engagement, a solenoid having a plunger disposed in end-to-end relation with said other end of the control shaft, said solenoid being operative upon energizing thereof to move said one end of the control shaft toward said one end of the drive shaft to separate said friction clutch elements, a low friction spherical bearing engaged between the next adjacent ends of the control shaft and plunger drivingly connecting the same for axial movement in a clutch disengaging direction while permitting relative rotation therebetween, and switch means responsive to rotation of the advance drum a predetermined amount for energizing said solenoid to separate the clutch elements.

References Cited in the file of this patent

UNITED STATES PATENTS

| | | |
|---|---|---|
| 696,284 | Vivinus | Mar. 25, 1902 |
| 1,431,597 | Poppelreuter | Oct. 10, 1922 |
| 2,153,317 | Sigo | Apr. 4, 1939 |
| 2,215,542 | Chappell et al. | Sept. 24, 1940 |
| 2,617,947 | Wolf | Nov. 11, 1952 |
| 2,746,834 | McLean | May 22, 1956 |
| 2,828,845 | Thornton | Apr. 1, 1958 |

FOREIGN PATENTS

| | | |
|---|---|---|
| 294,054 | Germany | Sept. 9, 1916 |
| 314,002 | Germany | July 16, 1921 |
| 324,816 | Germany | July 16, 1921 |